(12) United States Patent
Hilbelink

(10) Patent No.: US 8,331,635 B2
(45) Date of Patent: Dec. 11, 2012

(54) CARTESIAN HUMAN MORPHO-INFORMATIC SYSTEM

(75) Inventor: Don R. Hilbelink, Lutz, FL (US)

(73) Assignee: University of South Florida, Tampa, FL (US)

( * ) Notice: Subject to any disclaimer, the term of this patent is extended or adjusted under 35 U.S.C. 154(b) by 969 days.

(21) Appl. No.: 12/172,345

(22) Filed: Jul. 14, 2008

(65) Prior Publication Data

US 2008/0273775 A1 Nov. 6, 2008

Related U.S. Application Data

(63) Continuation-in-part of application No. 11/428,926, filed on Jul. 6, 2006, now abandoned.

(60) Provisional application No. 60/949,395, filed on Jul. 12, 2007.

(51) Int. Cl.
*G06K 9/00* (2006.01)
(52) U.S. Cl. ....................................................... 382/128
(58) Field of Classification Search .................. 382/128; 33/1 K, 1 BB, 1 CC, 512; 600/417
See application file for complete search history.

(56) References Cited

U.S. PATENT DOCUMENTS

| | | | | |
|---|---|---|---|---|
| 4,823,476 | A | * | 4/1989 | Curtin ............................. 33/512 |
| 5,371,778 | A | | 12/1994 | Yanof et al. |
| 5,845,638 | A | * | 12/1998 | Pretel et al. .................... 600/595 |
| 7,103,136 | B2 | | 9/2006 | Claus et al. |
| 7,133,041 | B2 | | 11/2006 | Kaufman et al. |
| 7,142,633 | B2 | | 11/2006 | Eberhard et al. |
| 7,184,814 | B2 | | 2/2007 | Lang et al. |
| 7,274,810 | B2 | | 9/2007 | Reeves et al. |
| 7,903,859 | B2 | * | 3/2011 | Boeing et al. ................. 382/131 |
| 7,935,055 | B2 | * | 5/2011 | Burckhardt .................... 600/300 |
| 2002/0049378 | A1 | * | 4/2002 | Grzeszczuk et al. .......... 600/427 |
| 2003/0228042 | A1 | | 12/2003 | Sinha |
| 2004/0252870 | A1 | | 12/2004 | Reeves et al. |
| 2006/0182340 | A1 | | 8/2006 | Cardenas et al. |

OTHER PUBLICATIONS

Clinical Anatomy 18: pp. 618-645 showing abstracts presented at 4th Joint Meeting of AACA and BACA, Jul. 2005 including Hilbelink, Don R. ("Three-dimensional Cartesian coordinate system for the human body").*
Hilbelink, Don R. "Digital Anatomy for the 21st Century: Creating the Virtual Patient", Presented Feb. 2006 at the History of Pathology Society Meeting.*
Curriculum Vitae of Don R. Hilbelink, dated Aug. 2008.*

(Continued)

*Primary Examiner* — Clayton E Laballe
*Assistant Examiner* — Leon W Rhodes, Jr.
(74) *Attorney, Agent, or Firm* — Nilay J. Choksi; Robert J. Varkonyi; Smith & Hopen, P.A.

(57) ABSTRACT

The present invention is a three dimensional Cartesian coordinate system for the human body, having three perpendicular and intersecting planes. The present invention is based upon the use of the three cardinal planes, in the universally recognized orientations. The cardinal planes in accordance with the present invention are: Sagittal: midsagittal plane, Transverse: upper-most extent of the iliac crests, and Coronal: anterior-most aspect of the vertebral canal. The point at which these planes intersect defines the 0,0,0 location in the human body.

25 Claims, 5 Drawing Sheets

OTHER PUBLICATIONS

Chen et al ("Universal Coordinate System of Visual Human Body"—Abstract, Computerized Tomography Theory and Applications, 2004).*

Mulani S. J., Kothare S. V., Patkar D. P. "Magnetic resonance volumetric analysis of hippocampi in children in the age group of 6-to-12 years : a pilot study." Neuroradiology. ISSN. 2005. vol. 47. No. 7. pp. 552-557.

Pfluger T., Weil S., Weis S., Vollmar C., Heiss D., Egger J., Scheck R., Hahn K. "Normative volumetric data of the developing hippocampus in children based on magnetic resonance imaging." Epilepsia. ISSN. 1999. vol. 40. No. 4. pp. 414-423.

Cakirer B., Dean D., Palomo JM., Hans MG. "Orthognathic surgery outcome analysis: 3-dimensional landmark geometric morphometrics." Int J Adult Orthodon Orthognath Surg. 2002. vol. 17. No. 2. pp. 116-132.

Dean D., Bookstein FL., Koneru S., Lee JH., Kamath J., Cutting CB., Hans M, Goldberg J. "Average African American three-dimensional computed tomography skull images: the potential clinical importance of ethnicity and sex." J Craniofac Surg. 1998. Jul. vol. 9. No. 4. pp. 348-358.

* cited by examiner

CARTESIAN HUMAN MORPHO-INFORMATIC SYSTEM

CROSS REFERENCE TO RELATED APPLICATIONS

This application is a continuation in part of co-pending U.S. patent application Ser. No. 11/428,926, filed Jul. 6, 2006. This application is also a non-provisional application of currently pending U.S. Provisional Patent Application 60/949,395, filed Jul. 12, 2007.

FIELD OF INVENTION

This invention relates to a 3D Cartesian coordinate system for use with human spatial morpho-informatics.

BACKGROUND OF THE INVENTION

Human anatomy has traditionally been a descriptive rather than an objective science. Except for measurement protocols for skeletal morphology developed by physical anthropologists, there has been very little data developed to define human morphology. For descriptive purposes classic anatomists have describe the human body as being placed in the "anatomical position". When in anatomical position the body is standing erect with the arms at the sides with the palms of the hands facing forward. The feet are flat on the ground with the toes pointing forward. Structure location is always described relative to other anatomical features. For example the feet are inferior to the head, the ribs are superficial to the heart, the elbows are lateral to the body and the fingers are distal to the elbow.

Without implementation of a fixed coordinate system linked to specific anatomical landmarks, the possibility to define specific quantitative data to be used to describe the specific location and orientation of any anatomy feature of any individual or population does not exist. The absence of a quantitative information on human anatomy also impacts clinical medicine. Radiologists are trained to recognize patterns of anatomy as displayed in medical images. Until late in the 20$^{th}$ century these images were primarily planar x-ray films. With the advent of CT, MR and PET scanning during the past 3 decades, the types of images that radiologists evaluate have varied along with the methods for how they are obtained, but the images remained primarily planar in format. Identification and extraction of quantitative anatomical data from three dimensional medical images consumes a vast amount of workflow in medicinal diagnostics. The inefficiency is partially due to difficulties in generalizing the steps needed for successful image segmentation of medical imaging data.

The interface between the medical image scanning technology and the patient in today's imaging facilities is the radiology technician, who undergoes one to two years of training on basic human anatomy and imaging technology. Medical imaging technology has advanced to the point that the imaging devices can capture and format the image data in a very short period of time. At the same time medical instrumentation has become so sophisticated that more and more expertise and time is required in the pre-scanning steps to program the device to collect the correct image data.

Only recently has volumetric medical image data been possible to obtain, and few if any processes are in place to effectively clinically evaluate this volumetric data. Most often even though the image data is obtained as digital volumetric data sets, a series of 2D images are provided to the radiologist with which to make his clinical diagnosis. Computer technology currently plays very little role in the analysis of any medical images in regards to assisting the physician in making a differential diagnosis. Furthermore, radiologists today treat each patient as a new unique set of images for which he diagnoses pathology evident in the images based on his experience and expertise in recognizing specific patterns in medical image patterns representing the patient's morphology. This approach is extremely inefficient, expensive and time consuming. This approach also fails to utilize any technology resources to assist the physician with medical image analysis.

Much of the information contained in the volumetric image data is not taken into consideration because physicians currently do not have a recognized approach for utilizing the information and do not have reference normative data on which to base any level of diagnostic decision. The rows and column array format of digital voxel data that is typical of most all volumetric medical images lends itself perfectly for the application of computer technology, but lack of a standard format and orientation for human anatomical image data has hindered the use of computer technology in any type of analysis of medical images. In many instances, the analysis of the structure occurs in isolation, without a comparison to a "normative" dataset of similar anatomical structures. Computer technology will never play a significant role in medical image analysis until a standardized coordinate system and a supporting set of validated statistical data regarding the morphological organization of the human body are available.

Even current computerized, semi-automated techniques employed to analyze medical images require heavy user intervention, resulting in high variability in quantification. U.S. patent application Ser. No. 10/271,916 provides a semi-automated system that attempts to reduce the labor, while increasing the accuracy using seeded region and snake segmentation methods. Even in the more simplified semi-automated techniques, experienced radiologists are needed to provide initial input, generally by outlining a structure of interest. The accuracy of this initial input affects all further processing. Differences in the examining radiologist and the fatigue of the radiologist affect the segmentation input and impact the reliability of the data obtained. Moreover, many of these processes use 2D images to extract information.

The enumerated issues with traditional anatomical diagnosis affects the quality of the medical diagnosis and treatment provided to patients. The field therefore needs a means by which to establish the normative human morphology data necessary to implement at the very least, first pass, computer-based analysis of all volumetric medical image data. Ultimately this will result in faster, more accurate diagnosis of all medical conditions that rely in some part on medical image information in making a differential diagnosis.

SUMMARY OF INVENTION

The inventive method allows for the extraction of quantitative information for human morphology from volumetric medical image data. As such the invention uses any imaging technology providing volumetric data, or technology where the data may be converted to volumetric data. Non-limiting examples of medical imaging technologies include computed tomography (CT), magnetic resonance (MR) imaging, positron emission tomography (PET), X-ray imaging, computed axial tomography (CAT), ultrasound imaging, and photoacoustic imaging.

Use of a defined three dimensional coordinate system to align and register volumetric medical imaging data of the human body within three dimensional space makes possible the objective analysis of the morphometric organization of any individual human as well as the ability to compare and statistically define the morphological characteristics of populations of humans. This permits description of quantitative data of the morphometric features of the body of any individual human, relative to any set of three dimensional coordinates. Further, changes in any morphological feature over time that occur as a result of normal development, growth, aging, acute insult or progressive changes related to disease processes may be described using the three dimensional coordinate system. Moreover, patterns related to normal development, growth, aging, acute insult or disease processes may be documented, described, analyzed, and diagnosed using the present invention. Statistically-derived data sets of morphometric changes, patterns or changes in patterns of digital image data characteristics are also useful in the present invention.

Due to conventional standard imaging protocols, the proposed "anatomical position" for this system in accordance with the present invention is a supine orientation with arms at the side of the body and hands pronated and resting on either side of the midsagittal plane, inferior to transverse cardinal plane. However, the position of the patient's body may be in any contemplated position. The patient may be positioned on a gantry in a head-first orientation relative to the scanning device. The gantry is oriented level with the ground and the patient is transported on the gantry through the scanning device with images being collected in a transverse plane through the patient. To permit the mining of objective data from these volumetric images for human morpho-informatics, the patient is positioned on the gantry relative to a defined morphometric coordinate system prior to initiation of the scanning. A plurality of imaginary planes are superimposed to the images, allowing establishment of a three dimensional coordinate system. Laser alignment lights, found on many imaging devices, may be used to align the patient on the gantry for proper positioning of the patient. The plane of the gantry is used to define an initial common plane of reference for both the scanner and the patient.

The patient's body is segmented into a plurality of regions by at least one imaginary plane. In some embodiments, the patient's body is segmented by two planes or three planes. In alternative embodiments, the imaginary planes establish a coordinate system using the three cardinal planes (X, Y and Z), in the universally recognized orientations and segment the body into regions of anterior/posterior, superior/inferior, and right/left. The imaginary planes are disposed along designated, relative positions of the patient's body. In some embodiments, the imaginary planes run through pre-designated anatomical features. The cardinal planes may include a Sagittal (midsagittal; symphysis pubis, the midpoint of the upper border of the manubrium of the sternum, and the nasion of the face/skull) plane, a Transverse (superior-most edges of the iliac crests) plane, and Coronal (anterior-most aspect of the vertebral canal) plane. However, other combinations of imaginary planes are comtemplated, such as running the Coronal Plane through the superior-most point on the iliac crests and external acoustic meatus or through the dorsal-most point on the spinous process. The point at which these planes intersect defines the 0, 0, 0 location in the human body. The disposition of the imaginary planes is, in some instances, standardized to allow comparison of the images with previous images of the same patient or images of other patients. Proper alignment of the patient within the coordinate system can be confirmed by any method known or contemplated by those in the art, like using the laser light guides built into most imaging systems.

Structures in or on the human body may be quantitatively described, based on the location from the intersection point. Positional information may be described in terms of arbitrarily units, or English or metric distance measurements. Arbitrary units may be utilized as linear or exponentially increasing units.

There are situations where alignment of the patient within the scanner was not accomplished prior to image capture, such as utilizing previous medical images in the present invention. In such situations, volumetric image data can be post-processed to orient the anatomical data. In some embodiments, post-processing involves re-slicing the original volumetric data to provide voxel array data oriented parallel with the coordinate system. Alternatively, the image data may be processed by reconstructing the image data, registering the image data in relation to the coordinate system, or rotating the image data to align with the coordinate system. The volumetric data may then be grafted onto the coordinate system and analyzed as though the data was originally aligned.

One set of resulting data will be the average location and orientation of the bounding box for each structure within the body along with statistical descriptors of possible deviations from these averages. Using statistically determined bounding boxes, the patterns of digital image arrays of any population of bounding boxes for each structure in reference to the three dimensional coordinate system may be mathematically defined. Digital image array patterns ranging from normal to the extremes of all described abnormal morphological conditions can be identified and statistically defined. This information is the used to statistically define specific patterns of the digital image arrays for each of the diagnosed conditions contained with image data base. This information would provide the first step in teaching the computer to do "first pass," providing a differential diagnosis based on a patient's image data.

Volumetric medical images are composed of arrays of rows and columns of voxels. Regardless of how that voxels are obtained (CT, MR, PET, etc) the final representation is organized in a 3D array. One of the features provided by the bounding box data approach is that the 3D grey scale voxel array patterns can be defined for normal conditions as well as for any and all variants of pathological conditions. With sufficient validated data sets of voxel grey scale array patterns, the scanning device computer may track the anatomical structures it is actively scanning and compare the active-scan structures to a validated database of voxel grey scan array patterns. Comparing the patient's array patterns with known patterns allows the computer to perform a real-time, first pass differential diagnosis of the image while the patient is still on the scan table. The results of the scan may be analyzed and, if the computer requires more information to make a decision, it has the opportunity to rescan the patient with an appropriate protocol the patient is still in the scanner.

After the image data is oriented relative to the three dimensional coordinate system, and with the computer aware of the voxel dimensions of the image data, any of a wide range of quantitative, morphometric measures can be made of relevant morphological features. These measurements can be made on any set of features, in any orientation within the volumetric image data. Bounding boxes are used by the invention to define the position and relative volume of a structural component. The edges of the box lay "in-plane" with those of the coordinate system. This permits the volume of the structural component relative to that of the whole body and position, within the bounding box of the whole body, to be determined.

Medical imaging technology has advanced to the point that the imaging devices can capture and format image data in a very short period of time. The invention contemplates that preset conditions can be optionally programmed into the scanning computer. After the patient is properly oriented in the scanner, the scanner begins a series of programmed preset image protocols based on physician request of radiological diagnosis and morphological data contained within the human morphometric data based on the coordinate system, and include the regions of the patient that were imaged and which imaging protocols utilized.

A normative human morphology database may be developed for all relevant structures for a large population of normal healthy individuals to describe complete array of statistical descriptors of the morphological features. Medical imaging of millions of patients is performed each year. For each of these scans a radiologist provides a medical opinion as to whether the morphology is normal or abnormal. When abnormal, the pathology is described. Using normal and validated abnormal morphology, a database or series of databases may be developed to define the array patterns of normal anatomical structures and disease conditions for which medical imaging is utilized as a diagnostic tool. This database then can be used to provide a measure of limits between normal (healthy) and abnormal (diseased/pathological) morphological structure. The information is used to develop software for a first pass differential diagnosis and more efficient and accurate scanning protocols. This will ultimately reduce the number of scans a person may require, reduce unnecessary radiation exposure, and will result in faster, cheaper and more accurate imaging processes.

Data may be stored in any format known in the art, including Picker SPECT, GE MR SIGNA—including SIGNA 3, 5, and Horizon LX—Siemans Magnatom Vision, CTI, CTI ECAT 7, SMIS MRI, and ASI/Concorde MicroPET. The standard format for volumetric medical image data to be captured and stored is in the DICOM format. Images in DICOM format can be viewed, modeled and measured on a wide range of public domain and commercial software available today. Any and all volumetric medical image data oriented as described above to a defined human morphometric coordinate system can be data mined to provide precise and comparable measurements for any and all relationships of anatomical features. Software plug-ins for several software packages have been developed to permit efficient mining of data from the DICOM image sets oriented within the coordinate system. The plug-ins permit the point and click identification and storage of the 3D coordinate of specific anatomical features. Line distant length between two anatomical features can be determined. Any 2D area or 3D volume can be user defined by a point and click approach and the volume and 3D coordinate location recorded.

If and when volumetric image data of human morphology is placed in registration within a three dimensional coordinate system, a wide range of quantitative measurements can be made to better document the structural features of the body. When fully implemented computer based technology will be able to determine if all internal structures are normal, and if not what are the likely medical problems. Use of the coordinate system permits quantitative description and analysis of structural features includes but are not limited to: location, volume, orientation, length and diameter of all individual structure as well as the spatial relationships of any combination of morphological feature of the human body relative to a any three dimensional coordinate system. If a similar process is applied to a population of humans with image data all registered with the same three dimensional space relative to a consistent coordinate system, then detailed statistical analysis can be conducted to establish mathematical descriptors for all levels of normal human anatomy as well as each and every known pathological condition that has, as one of its features, an alteration in the patient's anatomical structure. The resulting human morphometric data sets can be used in the development of computer software for the automated analysis of medical images. The ability to quantitatively describe the structure of the human body will significantly increase the value of medical imaging in $21^{st}$ century clinical medicine. This approach will ultimately provide faster, cheaper and more accurate initial stages of differential diagnosis of a wide range of medical conditions.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The invention provides an establishment of a protocol to extract quantitative information for human morphology from volumetric medical image data. The approach incorporates the implementation of a defined three dimensional morphometric coordinate system for registration of the volumetric image data of the human body in three dimensional space.

In most medical imaging technologies, including computed tomography (CT), magnetic resonance (MR) imaging and positron emission tomography (PET), the patient is positioned lying supine on a gantry in a head-first orientation relative to the scanning device. The gantry is oriented level with the ground and the patient is transported on the gantry through the scanning device with images being collected in a transverse plane through the patient. To permit the mining of objective data from these volumetric images for human morpho-informatics, the patient is positioned on the gantry and oriented to correspond to the morphometric coordinate system prior to initiation of the scanning Laser light or other orientation methods are used to orient the patient's body. Most imaging technology utilizes, or is capable of utilizing, alignment lasers. The lasers project lines onto the patient's body, one along the midsagittal axis and one along the transverse axis, perpendicular to the midsagittal axis. The radiologist aligns the transverse laser light with the superior-most edges of the iliac crests, identified on the patient by palpation. The lateral laser light is oriented to the sagittal plane by aligning the light to the symphysis pubis, the midpoint of the upper border of the manubrium of the sternum, and the nasion of the face/skull. Final confirmation of proper patient orientation can be made using scout images of the patient.

Figure 1:
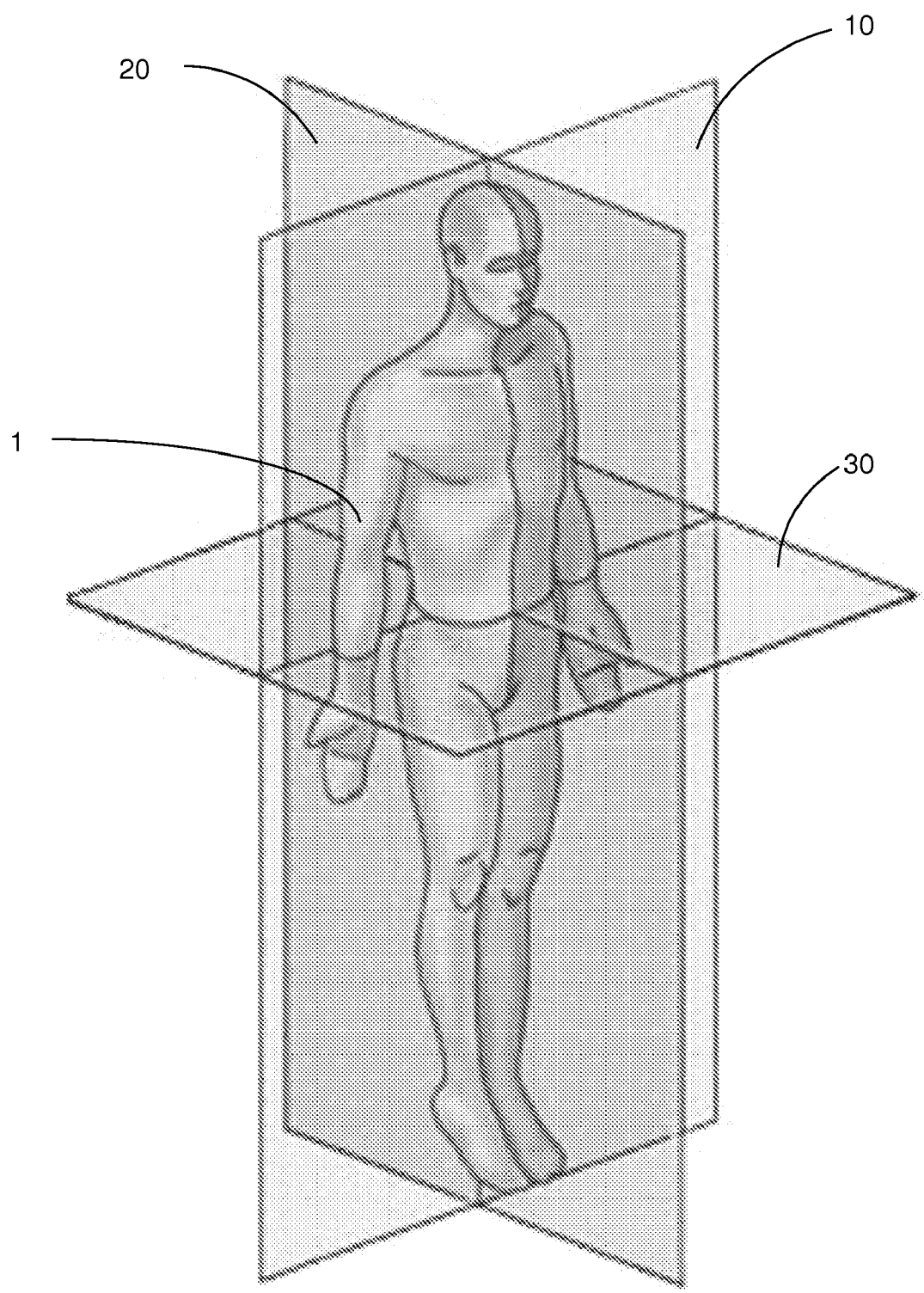
FIG. 1 is a view of the three cardinal planes relative to a human body.
Figure 2:
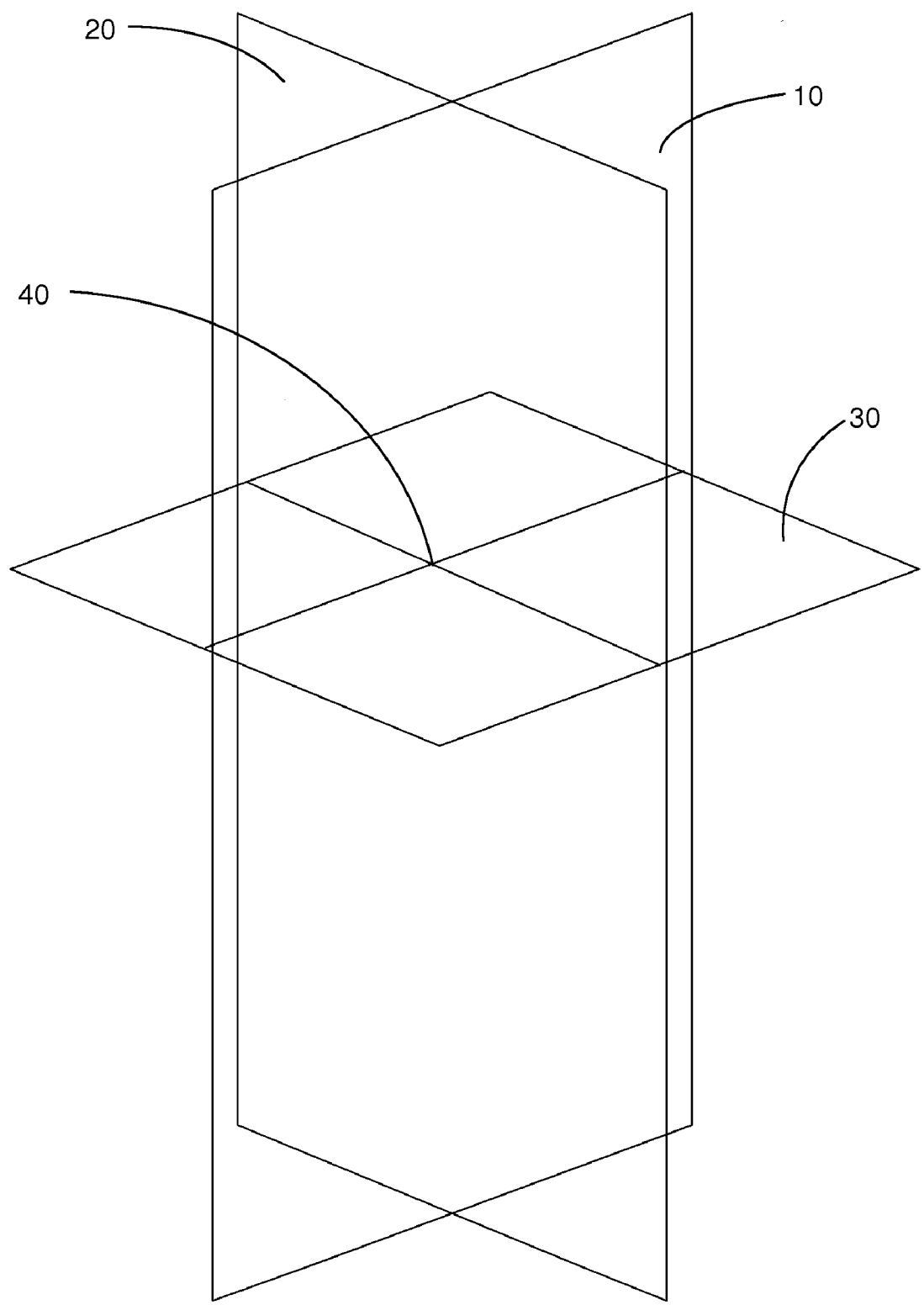
FIG. 2 is a view of the three cardinal planes showing the intersection point of all three planes.

As seen in FIG. 1, the patient's body is segmented into eight regions by a plurality of planes. The Coronal Plane 10 (or Frontal Plane) passes through the side of body 1, dividing body 1, or any of its parts, into anterior and posterior portions. Sagittal Plane 20 (or Lateral Plane) passes through the midline of body 1 from front to back and divides body 1, or any of its parts into right and left sides. Transverse Plane 30 (or Axial Plane) passes through the superior-most edges of the iliac crests dividing body 1, or any of its parts, into upper and lower parts. Coronal Plane 10, Sagittal Plane 20 and Transverse Plane 30 intersect at intersection point 40, seen in FIG. 2 with the body remove to allow visualization of the intersection point. Intersection point 40 is thereby used to define the 0, 0, 0 point of the body. The three cardinal planes (X, Y and Z) are disposed in a three dimensional orientation, with the Coronal Plane 10 defining the X-axis of a three dimensional coordinate system, the Sagittal Plane 20 defining the Y-axis, and Transverse Plane 30 defining the Z-axis.

There are occasions where medical images of a patient are not aligned with the morphometric coordinated system prior to imaging. In these situations, the volumetric image data can be post-processed to accomplish the proper orientation of the anatomical data relative to the coordinate system. In these cases it may be necessary to re-slice the original volumetric data to provide voxel array data oriented parallel with the coordinate system. The volumetric data may then be grafted onto the coordinate system and analyzed as though the data was originally aligned.

First Pass Differential Diagnosis

Volumetric medical images are composed of arrays of rows and columns of voxels. Regardless of how that voxels are obtained (CT, MR, PET, etc) their final representation is as digital voxel data organized in a 3D array. The present invention allows for a user to select an anatomical feature by circumscribing the feature in a bounding box.

One of the features provided by the bounding box data approach is that the 3D grey scale voxel array patterns can be defined for normal conditions as well as for any and all variants of pathological conditions. With sufficient validated data sets of voxel grey scale array patterns, the computer of the scanning device determines which anatomical structures it is actively scanning and utilizes a validated database of voxel grey scan array patterns for comparison at the time of scanning. By comparing the patient's array patterns with known patterns, the computer can perform a first pass differential diagnosis of the image as it is acquired and while the patient is still on the scan table. This permits the imaging system to rescan the patient with whatever protocol necessary if the computer determines it needs more information to make a decision. As this occurs in real-time, re-scanning of the patient occurs in the same imaging session as the original scan, while the patient is still in the scanner.

A normative database of human morphology can be developed for all relevant structures for a large population of normal healthy individuals to describe complete array of statistical descriptors of the morphological features of each and every structure chosen to be contained with the database. Medical imaging of millions of patients is performed each year. For each of these scans a radiologist provides a medical opinion as to whether the morphology is normal or abnormal. When abnormal, the pathology is described. Using this enormous data base of both normal and validated abnormal morphology, array patterns are clearly defined for most of the disease conditions for which medical imaging is utilized as a diagnostic tool. This data is used to develop the software for first pass differential diagnosis and well as more efficient and accurate scanning protocols. This data reduces the number of scans a person requires, thereby reducing any unnecessary radiation exposure. At the same time the imaging process can be made faster, cheaper and more accurate than currently exists.

The volumetric medical image data is captured and stored in DICOM format permitting the images to be viewed, modeled and measured on a wide range of public domain and commercial software available. DICOM formatted, volumetric medical image data is oriented to the defined human morphometric coordinate system and the data mined to provide precise and comparable measurements for any and all relationships of anatomical features. Software plug-ins for several software packages have been developed to permit efficient mining of data from the DICOM image sets oriented within the coordinate system. These plug-ins permit the point and click identification and storage of the 3D coordinate of specific anatomical features. Line distant length between two anatomical features can be determined. Any 2D area or 3D volume can be user defined by a point and click approach and the volume and 3D coordinate location recorded.

EXAMPLE

Figure 3:
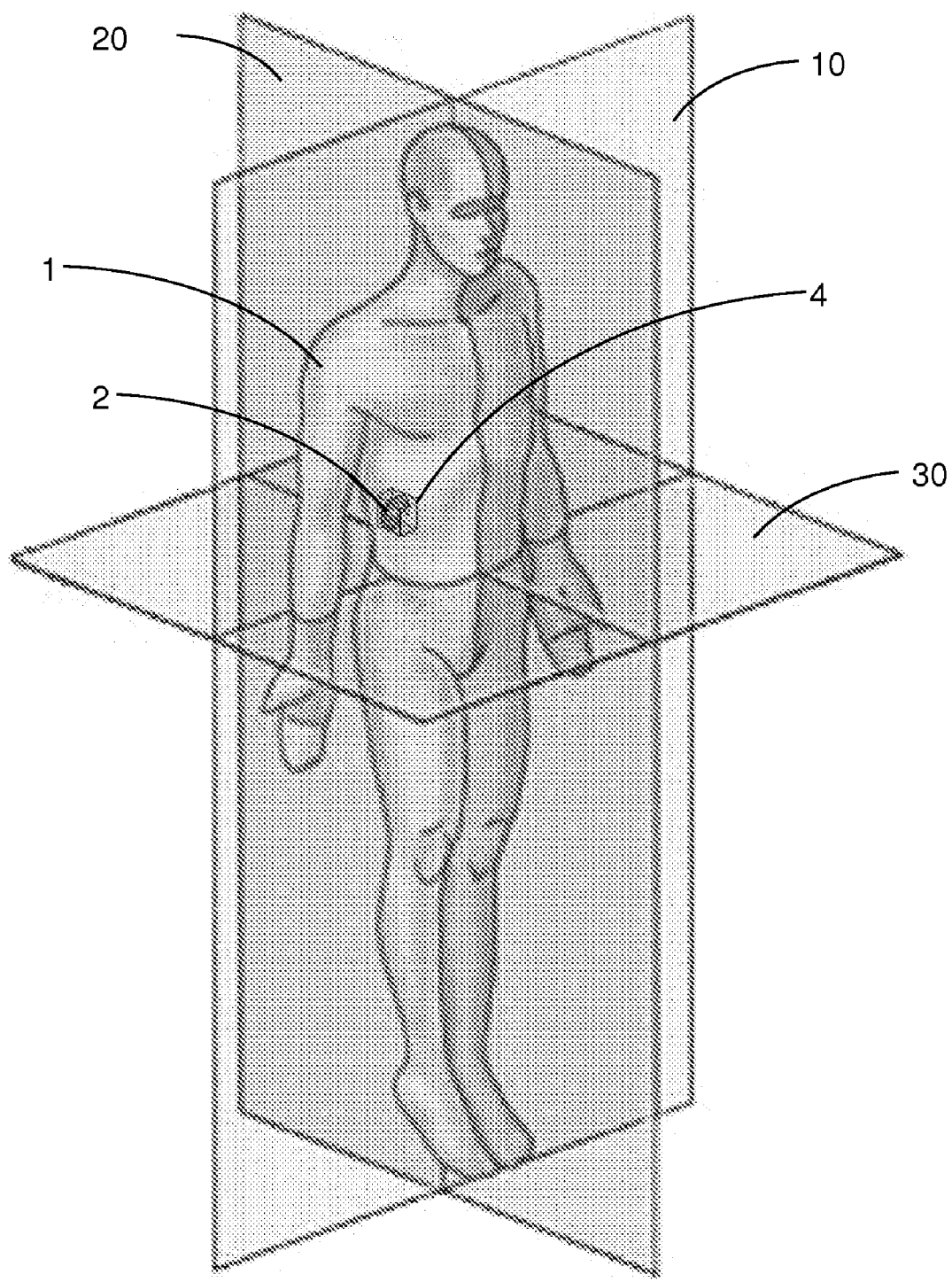
FIG. 3 is a view of the three cardinal planes relative to a human body showing circumscription of the body and an anatomical structure using a bounding box.

The present invention's ability to quantitatively describe the location of a structure in or on the human body is illustrated in the following example. Arbitrarily-chosen coordinates are utilized to define the location from intersection point 40 (0, 0, 0). As seen in FIG. 3, Sagittal plane 20 (X-axis) is defined from 50 (uppermost limit) to −50 (the lowermost limit); Transverse plane 30 (Y-axis) defined as 20 (right-most lateral limit) and −20 (the left-lateral-most limit); and Coronal plane 10 (Z-axis) defined as 10 (anterior-most limit) and −10 (the posterior-most limit). Body 1 is defined by body bounding box 3. Anatomical structure 2 is defined by structure bounding box 4. The points of the bounding box are determined on the coordinate system. In this example, the location of structure 2 would have a coordinate of (approximately) 10, 10, 10 (X, Y, Z). In this example, structure 2 is located approximately ⅕ of the distance upward on the coronal plane (X-axis) from the transverse plane (Y-axis), approximately ½ of the distance to the right on the transverse plane (Y-axis) from the sagittal plane (Z-axis); and the full anterior distance on the sagittal plane (Z-axis) from the coronal plane (X-axis).

Figure 4:
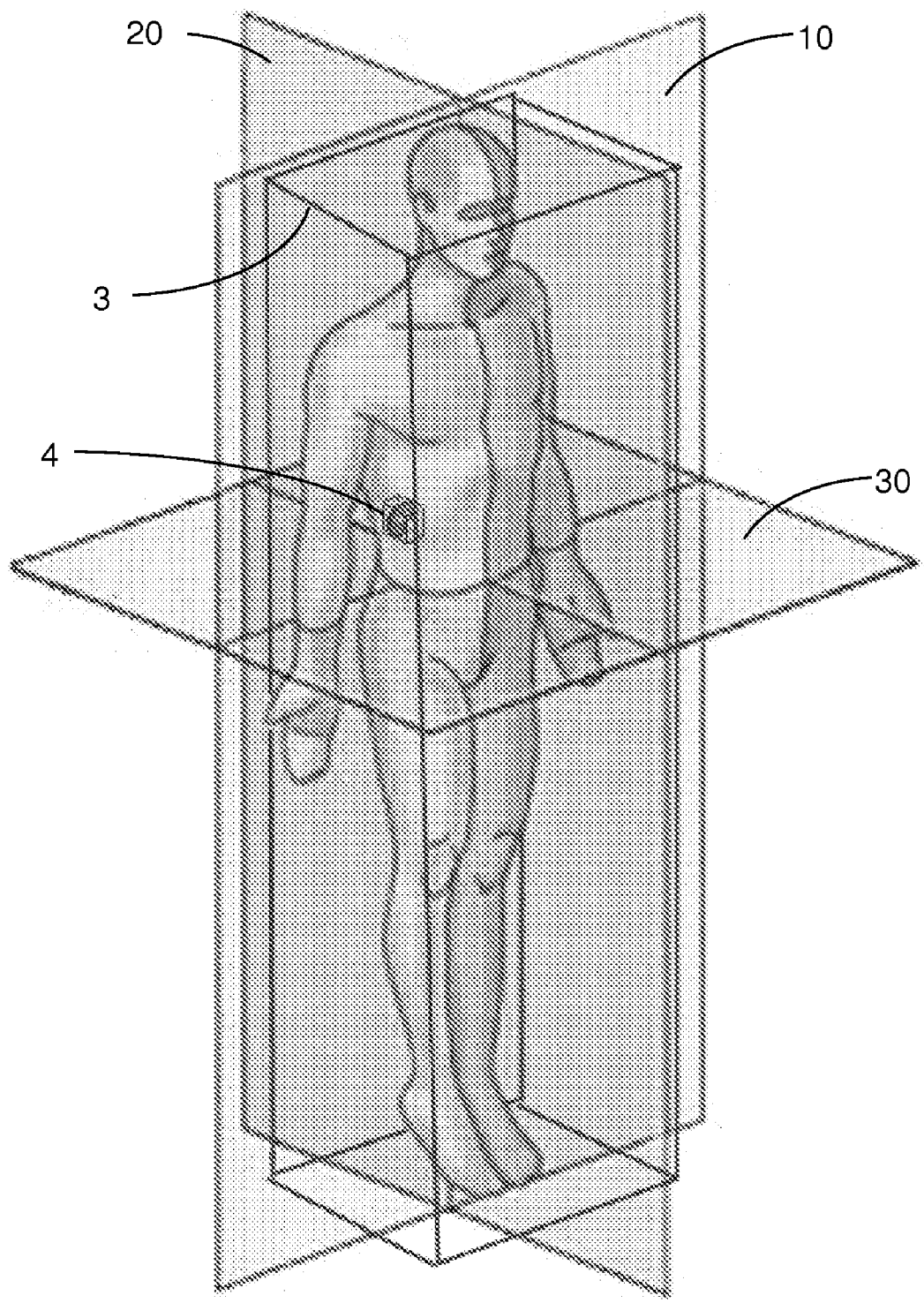
FIG. 4 is a view of the three cardinal planes relative to a human body showing the location of a structure of interest, determined using a bounding box.

By using the concept of "smallest bounding box" (sbb), data related to the position and relative volume a structural component of the body can be obtained. The sbb represents the smallest box into which the structure of interest will fit. The edges of the box lay "in-plane" with those of the coordinate system. Using this approach sbb 3 for body 1 as a whole can be identified and its volume calculated, as seen in FIG. 4. The sbb 4 for anatomical structure 2, for example the right kidney, can be determined and its volume calculated. Using these two pieces of data, the volume of the right kidney relative to that of the whole body, as well as the specific location of the right kidney bounding box within the bounding box of the whole body, can be determined.

Figure 5:
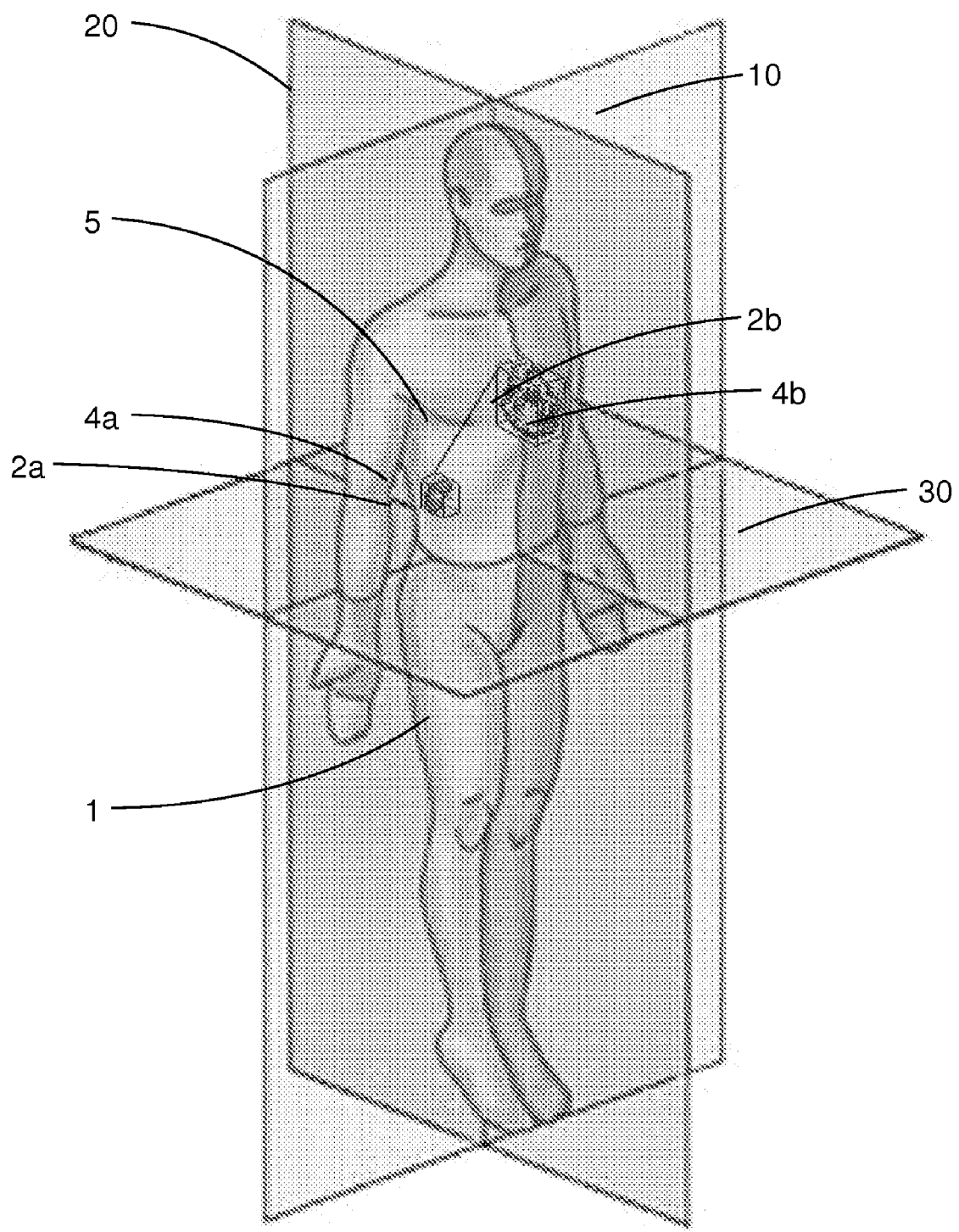
FIG. 5 is a view of the three cardinal planes relative to a human body showing the determination of distances and relationships between a structure of interest.

By using the sbb for a plurality of anatomical structures in body 1, relationships between different anatomical structures may be determined. For example, the distance and relative orientation between two anatomical structures may be determined by calculating the difference between points on the two anatomical structures' bounding boxes, as seen in FIG. 5. A user selects a first anatomical structure 2*a* and circumscribes the structure in structure bounding box 3*a*, followed by selecting a second anatomical structure 2*b* and circumscribing the structure in structure bounding box 3*b*. The present example shows a patient's right kidney and heart selected, however any anatomical structure obtained by the imaging system may be selected. The direct, linear distance 5 between the points is automatically calculated. Additionally, because the bounding boxes are aligned with the coordinate system of body 1, the position of the anatomical structures may be determined in relation to the patient's body and in relation to other anatomical structures.

Once these procedures are completed for all relevant structures for a large population of normal healthy individuals, a normative data base of human morphology is developed to describe statistical descriptors of the morphological features of each and every structure chosen to be contained with the data base. This data base then can be used to provide a measure of limits between normal (healthy) and abnormal (diseased/pathological) morphological structure.

One of the resulting data will be the average location and orientation of the sbb for each structure within the body along with statistical descriptors of possible deviations from these averages. Using these statistically determined sbbs, the patterns of digital image arrays may be mathematically defined for any population of sbb for each structure in reference to the three dimensional coordinate system. Digital image array patterns ranging from normal to the extremes of all described abnormal morphological conditions can be identified and statistically defined. With a large enough population of sbb for an anatomical structure and assuming that this population of sbb contains all defined diagnostic conditions then, it should be possible to statistically define specific patterns of the digital image arrays for each of the diagnosed conditions contained with image data base. This information is then useful in teaching the imaging computer to do "first pass", differential diagnosis based on a patient's image data.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between. Now that the invention has been described,

What is claimed is:

1. A method of aligning and registering volumetric medical imaging data of a human body, comprising the steps of:
    establishing a three dimensional coordinate system to segment the body into a plurality of regions, further comprising:
        establishing a first coordinal plane along a first axis of the body,
        establishing a second coordinal plane, perpendicular to the first plane, and
        establishing a third coordinal plane, perpendicular to both the first and second planes, along a third axis of the body;
    defining an intersection point of the planes as 0, 0, 0;
    obtaining volumetric medical imaging data of the body using the 0, 0, 0 intersection point;
    defining an anatomical structure of the body in the medical imaging data by comparing the medical imaging data to a plurality of data sets, wherein the plurality of data sets contains preexisting medical imaging data of one or more human bodies; and
    analyzing the anatomical structure in relation to the plurality of data sets using the three dimensional coordinate system to statistically define normal or pathological morphological features in the medical imaging data.

2. The method of claim 1, wherein
    the first coordinal plane is a Transverse Plane disposed along the superior-most edges of the iliac crests; and
    the second coordinal plane is a Sagittal Plane disposed through the symphysis pubis, the midpoint of the upper border of the manubrium of the sternum, and the nasion of the face/skull.

3. The method of claim 1, wherein the third coordinal plane is a Coronal Plane disposed along the anterior-most aspect of the vertebral canal.

4. The method of claim 1, wherein the volumetric medical image data is collected from medical imaging technology selected from the group consisting of computed tomography (CT), magnetic resonance (MR) imaging, positron emission tomography (PET), X-ray imaging, tomograms, ultrasound imaging, and photoacoustic imaging.

5. The method of claim 1, wherein the volumetric medical imaging data is obtained while the body is in a supine orientation, the body's arms are disposed parallel to the body, and the hands are pronated.

6. The method of claim 1, wherein the step of positioning the human body includes post-image collection processing selected from the group consisting of re-slicing the imaging data, reconstructing the image data, registering the image data in relation to the coordinate system, and rotating the image data,
    wherein the step of positioning the human body further includes grafting the image data onto the coordinate system after undergoing post-image collection processing.

7. The method of claim 1, wherein the anatomical structure is defined using a bounding box that has edges commensurate with the first coordinal plane, the second coordinal plane, and the third coordinal plane.

8. The method of claim 1, wherein the aligned and registered volumetric medical imaging data is used to describe morphometric at least one feature from the group consisting of position, volume, orientation, length, and diameter.

9. The method of claim 8, wherein the morphological characteristics of the volumetric medical imaging data is statistically analyzed to define normal or pathological morphological features in the volumetric medical imaging data.

10. The method of claim 9, wherein an automated determination of pathological conditions is performed using the analyzed volumetric medical imaging data.

11. The method of claim 1, wherein the aligned and registered volumetric medical imaging data is spatially and temporally tracked using the three dimensional coordinate system.

12. The method of claim 1, further comprising the steps of:
    identifying patterns, or changes in patterns of human morphology that are a result of the group selected from the group consisting of age, sex, normal-health, and pathology; and
    comparing the analyzed anatomical structure to the patterns of human morphology to provide a patient thereof a first pass differential diagnosis based on recognition of differences between voxel patterns of the analyzed anatomical structure and voxel patterns of the patterns of human morphology.

13. The method of claim 1, wherein the method produces statistically-derived data sets of patterns or changes in patterns from the image data so that the analyzed anatomical structure can be compared to the data sets of patterns or changes in patterns to provide a patient thereof a first pass differential diagnosis based on the analyzed anatomical structure.

14. A method of extracting information from volumetric images, comprising the steps of:
   obtaining volumetric imaging data from medical imaging technology;
   aligning and registering the volumetric medical imaging data, further comprising:
      establishing a three dimensional coordinate system to segment a body into a plurality of regions, further comprising:
         establishing a first coordinal plane along a first axis of the body,
         establishing a second coordinal plane, perpendicular to the first plane, and
         establishing a third coordinal plane, perpendicular to both the first and second planes;
      defining the intersection point of the planes as 0, 0, 0;
      defining an anatomical structure of the body in the medical imaging data by comparing the medical imaging data to a plurality of data sets, wherein the plurality of data sets contains preexisting medical imaging data of one or more human bodies; and
      orienting the anatomical structure in relation to the plurality of data sets using the three dimensional coordinate system to statistically define normal or pathological morphological features in the medical imaging data.

15. The method of claim 14, wherein
   the first coordinal plane is a Transverse Plane disposed along the superior-most edges of the iliac crests; and
   the second coordinal plane is a Sagittal Plane disposed though the symphysis pubis, the midpoint of the upper border of the manubrium of the sternum, and the nasion of the face/skull.

16. The method of claim 14, wherein the third coordinal plane is a Coronal Plane disposed along the anterior-most aspect of the vertebral canal.

17. The method of claim 14, wherein the volumetric medical image data is collected from medical imaging technology selected from the group consisting of computed tomography (CT), magnetic resonance (MR) imaging, positron emission tomography (PET), X-ray imaging, tomograms, ultrasound imaging, and photoacoustic imaging.

18. The method of claim 14, wherein the volumetric medical imaging data is obtained while the body is in a supine orientation, the body's arms are disposed transverse to the body, and the hands are pronated.

19. The method of claim 14, wherein the volumetric medical imaging data is oriented with the three dimensional coordinate system by post-image collection processing selected from the group consisting of re-slicing the imaging data, reconstructing the image data, registering the image data in relation to the coordinate system, and rotating the image data.

20. The method of claim 14, wherein the anatomical structure is defined using a bounding box that has edges commensurate with the first coordinal plane, the second coordinal plane, and the third coordinal plane.

21. The method of claim 14, wherein the aligned and registered volumetric medical imaging data is used to describe morphometric features from the group consisting of position, volume, orientation, length, and diameter.

22. The method of claim 21, wherein the morphological characteristics of the volumetric medical imaging data is statistically analyzed to define normal or pathological morphological features in the volumetric medical imaging data.

23. The method of claim 22, wherein an automated determination of pathological conditions is performed using the analyzed volumetric medical imaging data.

24. The method of claim 14, wherein the aligned and registered volumetric medical imaging data is spatially and temporally tracked using the three dimensional coordinate system.

25. The method of claim 14, further comprising identifying patterns, or changes in patterns of human morphology that are a result of the group selected from the group consisting of age, sex, normal-health, and pathology.

* * * * *